US008160392B1

(12) United States Patent
Chien

(10) Patent No.: US 8,160,392 B1
(45) Date of Patent: Apr. 17, 2012

(54) AUTOMATIC SUGGESTION OF IMAGE BLENDING TECHNIQUES

(75) Inventor: Jeff Chien, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 808 days.

(21) Appl. No.: 12/243,465

(22) Filed: Oct. 1, 2008

(51) Int. Cl.
*G06K 9/36* (2006.01)

(52) U.S. Cl. .................................................. 382/284

(58) Field of Classification Search .................. 382/267, 382/284
See application file for complete search history.

(56) References Cited

U.S. PATENT DOCUMENTS

| | | | | |
|---|---|---|---|---|
| 4,992,887 | A * | 2/1991 | Aragaki | 358/403 |
| 5,712,890 | A * | 1/1998 | Spivey et al. | 378/37 |
| 6,034,723 | A * | 3/2000 | Fujimori | 348/207.99 |
| 7,116,830 | B2 * | 10/2006 | Srinivasan | 382/236 |
| 7,620,909 | B2 * | 11/2009 | Park et al. | 715/790 |
| 7,650,044 | B2 * | 1/2010 | Kreang-Arekul et al. | 382/274 |
| 2007/0159524 | A1 * | 7/2007 | Kim et al. | 348/36 |

OTHER PUBLICATIONS

Zhao, International Journal of Pattern Recognition and Artificial Intelligence: Flexible Image Blending for Image Mosaicing with Reduced Artifacts, 2006, Wolrd Scientific Publishing, pp. 1-18 plus abstract page.*

"Adobe Photoshop CS3 Online Help", *Take pictures for use with Photomerge*, excerpted from http://livesdocs.adobe.com/en_US/Photoshop/10.0 (accessed Aug. 26, 2008), 12 pages.

"EXIF Specifications", page updated Jul. 21, 2003, available at http://www.exif.org/specifications.html.

"Fully Automatic 2D Stitching", *Panoramas*, availabe at http://www.cs.unc.ca/~mbrown/panorama/panorama.html (last accessed Aug. 20, 2008) 13 pages.

Agarwala, et al., "Interactive Digital Photomontage", *ACM Transactions on Graphics (Proceedings of SIGGRAPH 2004)*, 2004, available at http://grail.cs.washington.edu/projects/photomontage.pdf (last accessed Oct. 1, 2008), 9 pages.

Peterson, John "Systems and Methods for Using Image Collections", U.S. Appl. No. 12/243,694, filed Oct. 1, 2008.

Petschnigg, et al., "*Digital Photography with Flash and No-Flash Image Pairs*", available at http://research microsoft.com/projects/FlashNoFlash (last accessed Aug. 20, 2008), 11 pages.

Raskar, Ramesh et al., "Computational Photography, STAR-State of the Art Report", *Eurographics*, 2006, 16 pages.

* cited by examiner

*Primary Examiner* — Matthew Bella
*Assistant Examiner* — Dennis Rosario
(74) *Attorney, Agent, or Firm* — Kilpatrick Townsend & Stockton LLP

(57) ABSTRACT

Methods and systems can allow a user to avoid the inconvenience of selecting which of several computational photography techniques to apply when blending images. Instead, the user's workflow can be simplified in some cases and/or the image processing software can be less confusing to the user. For example, the user may import a set of images to image editing software. The software can automatically suggest a computational photography technique or techniques to apply to the set of images identified by the user. For example, the software may determine that the set of images comprise a stack or that the set of images comprise a panorama and suggest an appropriate technique for confirmation by the user. The software may apply the computational photography technique without the need for user intervention.

25 Claims, 7 Drawing Sheets

AUTOMATIC SUGGESTION OF IMAGE BLENDING TECHNIQUES

TECHNICAL FIELD

The disclosure below generally relates to digital image processing.

BACKGROUND

Users of image processing programs can manipulate digital images using a variety of techniques. Some techniques parallel traditional photo editing. For example, a user can mimic traditional photo-processing techniques such as touching up an image or cutting and pasting several images into a panoramic view.

Image processing programs also allow the use of one or more computational photographic techniques. A user can provide several images to the image processing program and select a computational photographic technique (referred to as a "Blend Technique" or "Blend Method" below) to apply. When an image processing program is used, of course, "applying" the blend method does not necessarily result in a loss of the original images as may be the case when a traditional technique is used. For instance, in ADOBE® PHOTOSHOP®, available from Adobe Systems Inc. of San Jose, Calif., users can open or import a group of images and select an image blending technique to combine the images.

In some software, the user can select between a "panorama" technique and a "stack" technique. For example, the user may provide several images and direct the image processing software to automatically combine the images into a panoramic view without the need for the user to cut and paste the images.

Generally, a "stack-based" technique refers to a blending technique in which a group of images share the same (or nearly the same) field of view but differ in one or more other aspects. For example, different images in the group may be taken with different exposures, different focus (via changes in focus settings and/or camera distance), or different illumination (e.g. flash). As another example, a user can provide several images taken with different shutter speeds and direct the image processing software to produce a single image capturing an entire dynamic range of the several individual images. Still further, the user may provide several images taken with or without a flash and direct the image processing software to produce a single image capturing aspects of images taken with and without flash illumination. As a further example, the user may provide several images taken with different focus points and direct the image processing software to generate a single image having the better-focused portions from the group (sometimes referred to as an "extended depth of field" image or "best focus" image).

The choice of blending options may be one of thousands of potential commands available to the user of the image processing software.

SUMMARY

Some embodiments of the present subject matter provide methods and systems that allow a user to avoid the inconvenience of selecting which blending technique to apply. Instead, systems and methods of the present subject matter can automatically suggest a technique or techniques to apply to a set of images identified by the user and/or may apply the blending technique without the need for user intervention. Thus, the user's workflow can be simplified in some cases and/or the image processing software can be less confusing to the user.

For instance, the suggested blending technique may comprise a technique determined to be the most likely technique to apply based on one or more characteristics of the images. For example, the software may align the images and then determine the amount of overlap. Additionally, in some embodiments, the software may evaluate one or more metadata characteristics of the images.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components.

DETAILED DESCRIPTION

Figure 1:
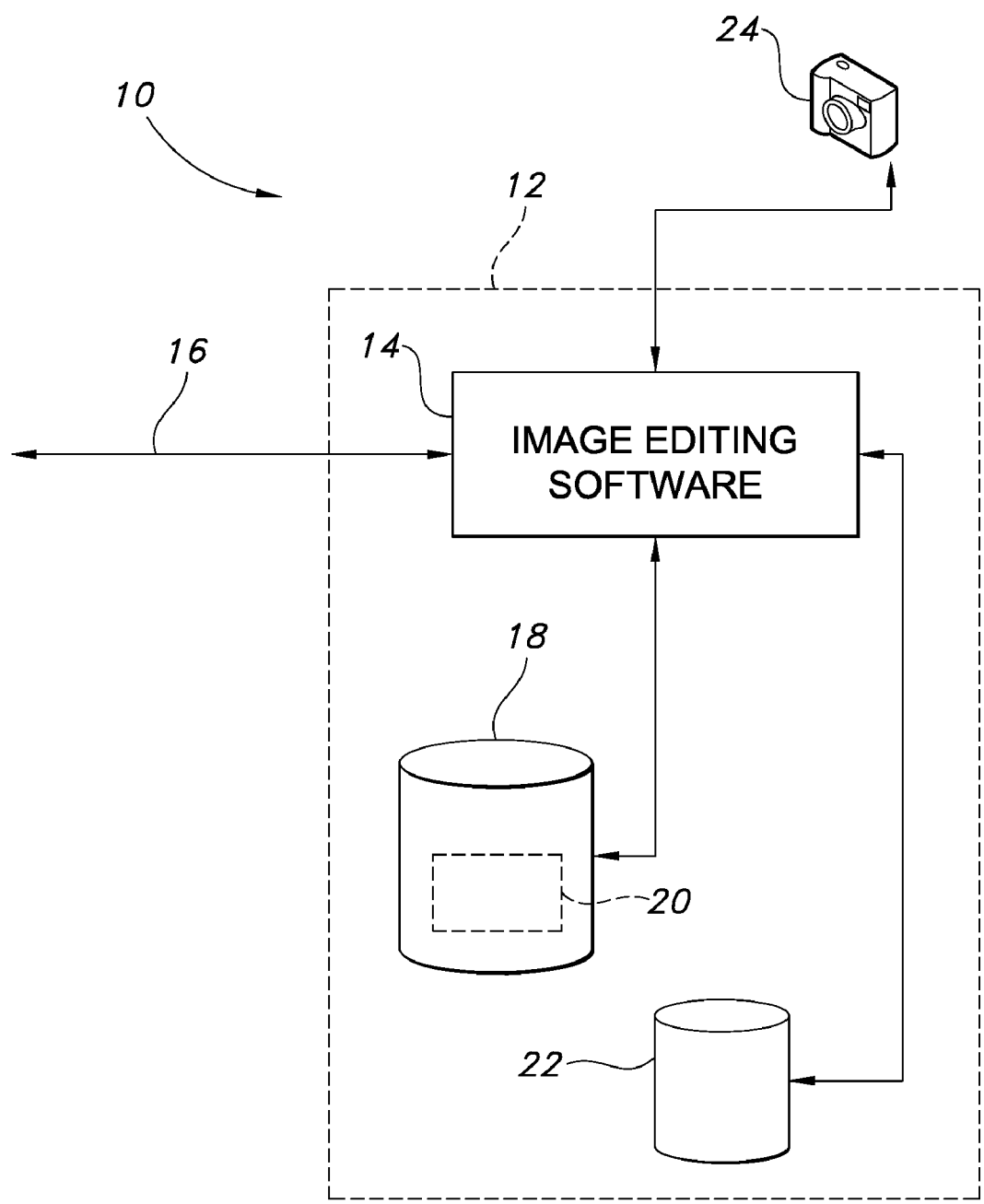
FIG. 1 is a block diagram illustrating one example of a local system architecture for implementing embodiments of the present subject matter.

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In some embodiments, a computerized method can comprise accessing data identifying a plurality of digital image file for application of a blending technique—that is, files to which it is intended that a blending technique will be applied. The method can comprise selecting, from a plurality of blending techniques, a default blending technique to apply to the plurality of digital image files. Data identifying the default blending technique can be stored and/or output.

For example, a user may import or otherwise indicate a group of images to image editing software and indicate that "blending" in general is desired. The data identifying the default blending technique can be output to the user in a dialog box, via a popup window, or other suitable message suggesting the use of the default blending technique for the indicated group of images.

The default technique may be selected automatically; that is, without the need for user input in determining which technique is the default technique. Although the default technique may be selected automatically, this does not necessarily preclude later user intervention. For example, in some embodiments, a user may intervene or confirm that the default technique is the correct one to apply to the digital images.

In some embodiments, outputting data suggesting the default blending technique can comprise populating one of a plurality of selection options in a user dialog, with each selection option associated with a different blending technique. For example, the populated one of the selection options can correspond to the default blending technique so that the default technique is automatically selected in the dialog for that particular blending instance. In another blending instance, a different technique may be automatically selected.

The method can comprise creating a blended digital image by applying the default technique to the plurality of digital image files after receiving user confirmation of the selection; in some implementations, the method can comprise applying the technique without user confirmation.

In some implementations, determining a default blending technique comprises aligning the images of the plurality of digital image files and evaluating the common overlapping area among the images of the plurality of digital image files after alignment. The default blending technique can be selected based on correlating the amount of common overlapping area to a blending technique. For example, images with a large degree of overlap may be considered for one or more stack-based blending techniques, while images with lesser overlap may be considered for other blending techniques such as assembling a panorama.

One example of evaluating the common overlapping area can include, for each digital image file of the plurality of digital image files, determining a closest image overlap between that digital image file and second digital image file of the plurality of digital image files. The closest image overlap can be the amount of overlapping area that is greater than any overlap between that digital image file and any other digital image file of the plurality of digital image files. Other techniques can be used to evaluate the degree of overlap.

In certain implementations, a default blending technique can be selected based on evaluating at least one metadata characteristic of the plurality of digital image files. For example, one or more of the following metadata characteristics may be considered: flash status, exposure, or focal length. Of course, additional metadata characteristics could be considered beyond these example characteristics.

Aspects of the method noted above can be implemented by a system comprising at least one computing device. For example, one or more computer-readable media can embody program code which, when executed, causes at least one computing device to perform steps comprising one or more embodiments noted above.

With some of the more general aspects of the present subject matter set forth above, the specification now turns to exemplary details of certain embodiments of the present subject matter.

FIG. 1 is a generalized block diagram showing software components in a system 10 for automatically suggesting a blending technique. System 10 may be implemented by one or more computing devices 12. Image editing software 14 represents an application, process, or of component that allows a user to perform manipulations of digital images. For example, image editing software 14 may provide functionality found in products such as ADOBE® PHOTOSHOP®, available from Adobe Systems Inc. of San Jose Calif. Image editing software 14 may comprise a suite of applications, processes, or components in some embodiments.

Generally, image editing software 14 provides an interface for user input/output 16. Output provided by image software 14 may include rendering of images in one or more perceptible forms, such as by printing images or presenting images via one or more display devices in response to user commands and selections. Input may comprise user commands, manipulation of files, and other directions provided via a mouse, keyboard, or other input device(s).

Image editing software 14 can access a local store 18 comprising digital image files and related data and/or may access files from an imaging device 24, represented in this example as a digital camera. However, image editing software 14 may be capable of interfacing with other devices such as optical scanners for obtaining images from prints or photo negatives and/or remote resources, such as remote hosts for digital image files. Moreover, computing device 12 could comprise an imaging device with suitable processing capability. Data store 22 is depicted in FIG. 1 to represent working files used by image editing software 14 and other applications or components of computing device 12.

In accordance with some aspects of the present subject matter, image editing software 14 can be configured to automatically suggest blending techniques to a user. As will be discussed below, a user can identify a set of digital image files 20 to image editing software 14 for use in a blending technique. Image editing software 14 can automatically suggest a default blending technique to the user and thereby spare the user from having to manually select or recognize an appropriate technique. If the user is unfamiliar with all of the commands of image editing software 14 and/or contemplates performing a number of blending operations, the user's workflow and overall experience may be significantly improved.

Figure 2:
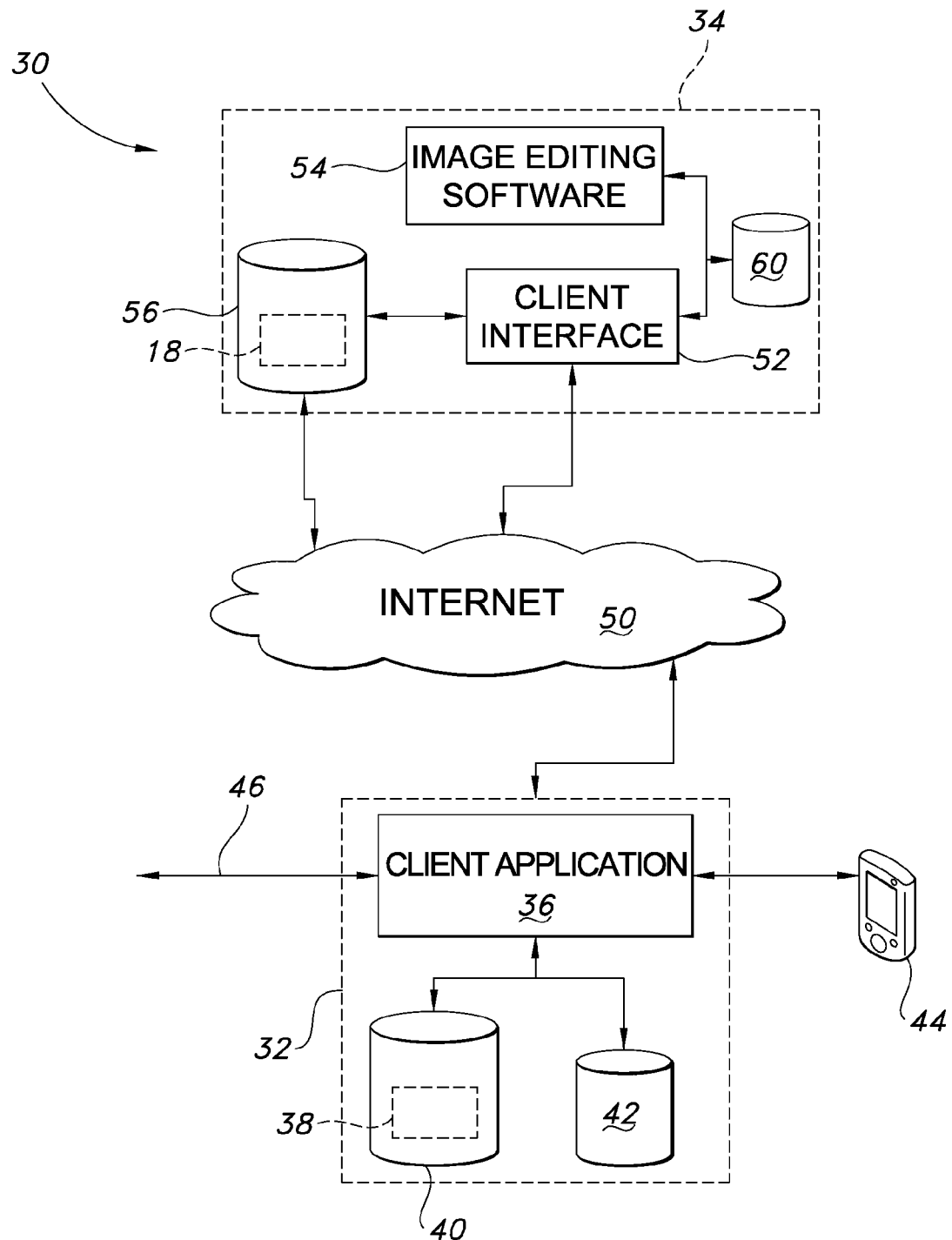
FIG. 2 is a block diagram illustrating one example of a distributed architecture for implementing embodiments of the present subject matter.

Before turning to the details of automatic suggestion of blending techniques, another exemplary architecture 30 will be discussed in conjunction with FIG. 2.

Architecture 30 represents an exemplary network-based implementation incorporating embodiments of the present subject matter. Although computing device 32 of FIG. 1 could include a network connection, in this example, image editing software is remotely hosted relative to the end user's device. Particularly, a user device 32 interacts with a server 34 which hosts image editing software 54. A client application 36 provides an interface for user I/O 46, which may include images and other output and user input as noted above.

Client application 36 can access data store 40 and working files 42 in the course of operation, and may provide connectivity with imaging devices 44, shown in this example as a personal digital assistant (PDA) or cellular telephone including an image sensor. However, computing device 32 could comprise a PDA, camera, cellular telephone, or other device with image capture capability and sufficient network and processing capabilities to implement the present subject matter.

Client application 36 can access server 34 over internet 50 as shown in this example or via one or more other suitable networks. Client application 36 may represent, for example, an internet browser, plug-in, or a dedicated application for accessing and interacting with image editing software 54 and/or other components of server 34. Although this example depicts internet 50, in some implementations, image editing software 54 may be hosted on a server 34 accessible via a local area network or other network providing connectivity between server 34 and user device 32.

Server 34 includes client interface 52, server data store 56, and server working files 60. Image editing software 54 can respond to user input relayed to server 34 via client application 36, internet 50, and client interface 52. For example, image editing software may be provided in a "software as a service" arrangement to end users. As another example, server 34 may provide photo sharing and hosting services, with image editing software 54 representing editing capability extended to users via client application 36.

In any event, image editing software 54 can be configured to automatically suggest blending techniques to users. For example, a user may identify one or more files 38 and/or 58 as subjects of a blending operation. Image editing software 54 can suggest an appropriate blending technique to a user by relaying data to the user via client application 36.

Figure 3:
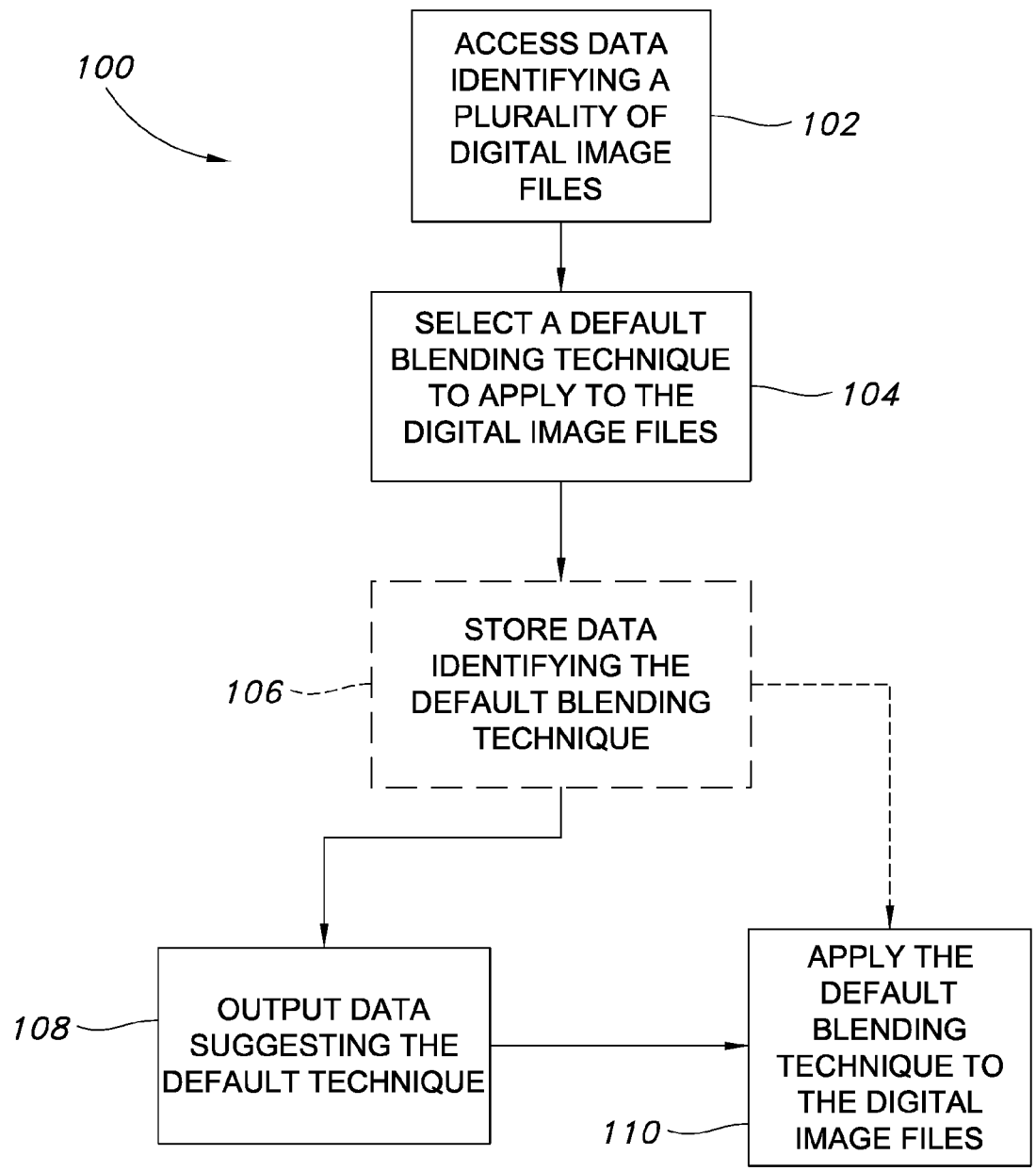
FIG. 3 is a flowchart showing steps in an exemplary method for suggesting a blending technique.

FIG. 3 illustrates exemplary steps in a method 100 for automatically suggesting a blending technique. For example, a user may select a set of digital image files via suitable image editing software commands. The user may, for instance, import files one-by-one or in batches, such as via an import script or command. After the user has imported or otherwise designated the files, the user may trigger a command indicating a desire to blend the images, which in turn triggers one or more processes configured to perform in accordance with the present subject matter.

At 102, the computing device(s) implementing method 100 access data identifying a plurality of digital image files. For instance, the image processing software may allow editing of images in terms of "layers." Pixels may be defined in area coordinates (e.g. x-y coordinates) plus a coordinate corresponding to the layer (e.g. a z-coordinate). If the user placed the digital image files of interest into respective layers and selected a "blend" command, the accessed data could correspond to data in each respective layer. However, it should be noted that the present subject matter is not limited to only image processing software that supports layer-based editing. At 104, a default blending technique applicable to the plurality of digital image files is selected. One exemplary implementation of step 104 is discussed below in conjunction with FIG. 4.

At 106, data identifying the default blending technique is stored. This may be a temporary event followed by one or more actions nearly immediately after the blending technique is identified. However, in some implementations, the data identifying the default blending technique can be stored for later use, e.g. in another session of the image editing software or by another process that handles the blending operation.

Steps 108 and 110 are included to represent examples of actions that may be taken after method 100 has determined a default blending technique. At step 108, data suggesting the default blending technique can be output. As an example, a dialog or other interface can be triggered where a user can select from different blending techniques. The default blending technique can be preselected or otherwise designated as the default choice for the dialog. Thus, the user can simply confirm the "default" choice. Such an auto-suggest feature may reduce the input and understanding required by a user wishing to utilize blending techniques. Generally, a user's workflow may be improved by skipping a selection step that might otherwise be required.

It should be understood that in some instances it is possible that the default blending technique may not match the user's intended blending technique. For example, a user may take several images for a panorama that have such a large degree of overlap that a stack-based technique is suggested. However, such cases should be few and far between if the operating parameters of the auto-suggest function are properly adjusted.

Step 110 represents another output option for the suggested technique. Namely, the default blending technique can be performed on the plurality of digital image files. Step 110 may follow step 108 after a user's confirmation (or may occur automatically, e.g. after a time-out period following step 108). In some embodiments, the blending technique may be performed without confirmation by a user. Thus, the technique may be "suggested" via output of the finished blending product.

Figure 4:
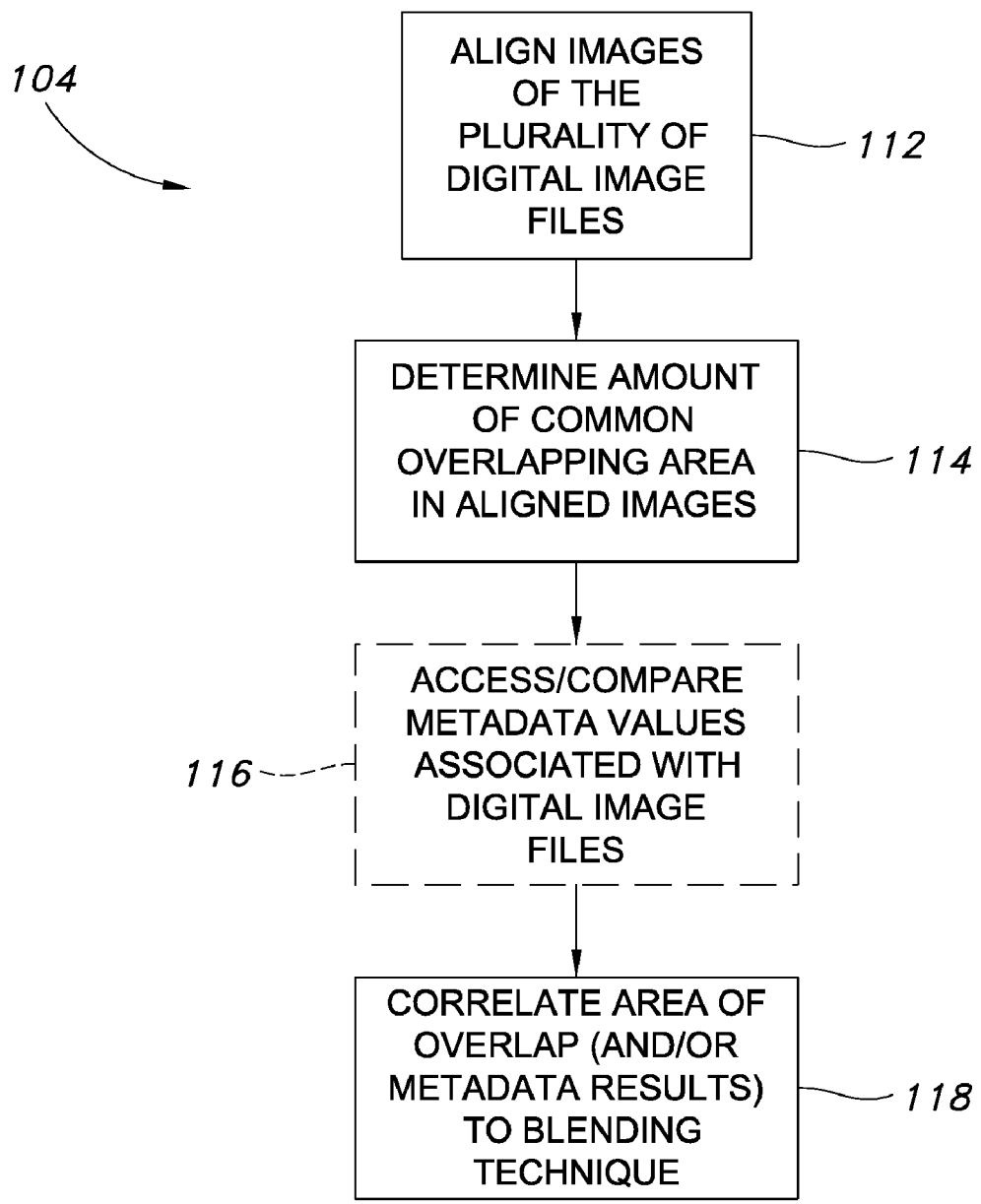
FIG. 4 is a flowchart showing steps in an exemplary method for determining which blending technique to suggest.

FIG. 4 is a flowchart showing exemplary steps in a method 104 for determining a default blending technique applicable to a plurality of digital image files. At step 112, the images are aligned. Image alignment can be performed automatically or manually as should be known to one of ordinary skill in the art. For instance, a suitable image alignment algorithm may rely on identifying common features in the plurality of digital images and align the images so that common features overlap or nearly overlap.

Put another way, the images can be positioned relative to one another so that pixels from different images but showing common features are "on top" of one another. For instance, the image processing software may represent different images as "layers" having suitable area coordinates. When aligned, the images can be positioned in respective layers so that common features have the same area coordinates. For example, if each layer has x-y coordinates and layers are identified by a z-coordinate, common features will have the same (or nearly the same) x-y coordinates after alignment.

Step 114 represents determining the amount of common overlapping area in the aligned images. The amount of overlapping area can be used as an indication of the most likely type of blending technique. For example, if a user has provided a group of digital image files intended to be blended into a panorama, the image files may share some common features with adjacent files near the edges of the panorama components. Thus, when the panorama components are aligned, the components will overlap at the edges.

On the other hand, if the user has provided a group of files intended to be blended using a stack-based technique, the image files may share common features throughout. Thus, when the stack components are aligned, the images will completely or nearly completely overlap. It should be noted that the overlap may not be total. For example, even if a user takes multiple pictures using a tripod, subtle movements of the camera or other imaging device can result in a small degree of misalignment. However, the amount of overlapping area for a stack-based technique generally will exceed the amount of overlapping area for a panorama technique.

Some image processing programs can determine the particular blending operations that are needed based on the image characteristics after determining that a "stack" blending technique is to be used. For example, if a series of images are taken with different exposures, the image processing software can determine the difference in dynamic ranges and blend the images into a high dynamic range (HDR) image. The series of images may feature areas with different degrees of sharpness (e.g. images with the same overall exposure, such as images captured with the same shutter speed but different aperture values). If so, the software can determine that the images are to be blended into a "deep focus" or "extended depth of field" image that comprises the areas of better or best focus from the images of the stack. In some embodiments, once a "stack" blending technique is chosen, the user may be presented with options as to which particular blending technique to use.

Step 116 is shown in dotted lines to represent an optional step in which metadata values of one or more of the digital image files are considered. For example, image metadata can be provided via a separate file and/or may be embedded in a digital image. Metadata can be recorded by the camera or other imaging device that captured the associated digital image or may originate elsewhere. As one example, certain cameras capture EXIF data and embed the metadata in the actual image files (for example, if JPEG files are output by the camera) and/or provide the metadata in a separate file linked to the image file (for example, if RAW files are output by the camera).

Examples of metadata can include date and time information identifying when the photo was captured and camera settings and information. Camera settings and information can include camera model, orientation, aperture, shutter speed, focal length, metering mode, lens used, flash status, and ISO speed or other exposure information. In some embodiments, the image metadata can comprise a thumbnail for previewing the picture.

Metadata values of digital images can be identified and, in some cases, metadata values of images in the group can be compared. This may help aid in determining which blending technique to suggest. For example, a series of images with metadata indicating differing focal lengths will be more likely to be considered for a stack-based technique such as the technique noted above that assembles an image with better or best focus from several images in the group. As an example, metadata may indicate that a set of images share the same shutter speed but different aperture (f-number) values. On the other hand, images with the same focal length and exposure values in the metadata may be a candidate for a panorama. As another example, a group of images with metadata indicating that a flash was used in one but not the other may be subjects of a stack technique (Flash/No Flash) provided there is a sufficient overlap.

Step 118 represents correlating the area of overlap to a blending technique. For example, in some embodiments, a stack blend technique is suggested if the overlapping area is greater than 50%, and in some implementations, if the overlapping area is greater than 70%. Otherwise, if there is any overlap, a panorama blend technique is suggested. If there is no overlap, an error or alert may be returned. In some embodiments, step 118 can additionally or alternatively represent correlating the results of accessed or compared metadata values to blending techniques if step 116 is performed.

Figure 5:
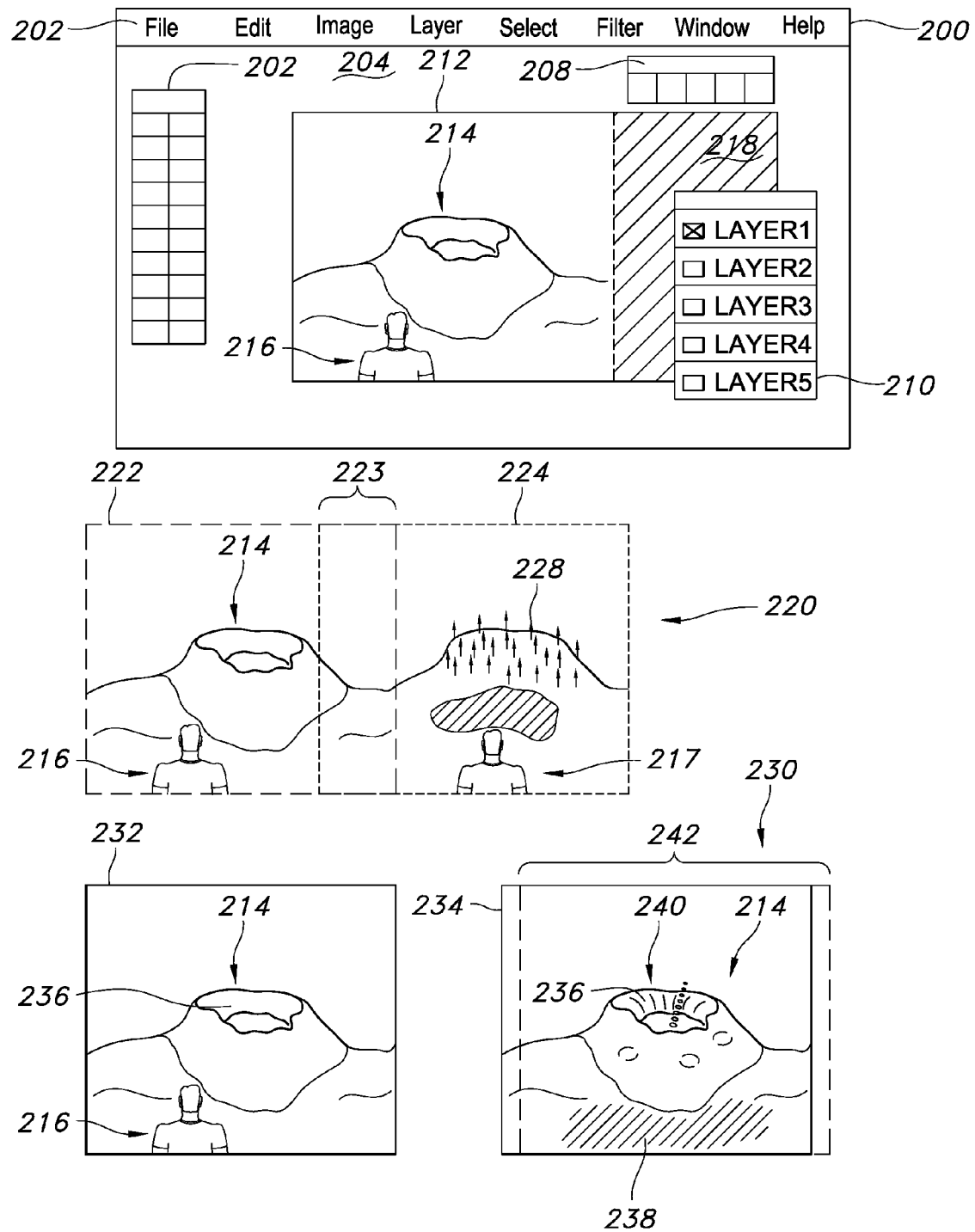
FIG. 5 is an example of a user interface for image editing software.

FIG. 5 is an example of a user interface 200 for image editing software. For example, interface 200 may be rendered by image editing software 14 of FIG. 1 or by client application 36 in conjunction with image editing software 54 of FIG. 2. In this example, user interface 200 comprises a window including a toolbar 202 and work area 204. Menu bar 202 includes menus such as file, edit, image, layer, select, filter, window, and help. It will be understood that FIG. 5 depicts a simplified interface and the available commands and layout may vary.

In this example, two exemplary tool palettes 206 and 208 are shown; each palette may include a number of tools such as a select tool, paint tool, fill tool, pen tool, clone tool and other software tools whereby a user can manipulate image components. Work area 204 includes window 212 and layer selection menu 210. In this example, layer selection menu 210 shows five available layers (LAYER 1-LAYER 5), but only one of which is selected. Thus, window 212 shows a working file which, in this example, includes an area depicting volcano 214 and subject 216 but also a blank area 218 (indicated by cross-hatching).

In some embodiments, each layer may correspond to a different digital image file indicated to the image processing software by user commands or actions. For example, the user may copy or open a plurality of different image files and paste each image into a separate layer in the working file. As another example, the user may activate a script that opens a plurality of digital image files and places each file into a separate layer.

The contents of the layers will, of course, depend on the particular digital image files. FIG. 5 indicates one example at 220 showing some of the layer contents in an example case where the digital image files are intended for blending into a panorama. Although five layers are shown in layer palette 210, only two image files are shown in this example. Particularly, the panorama comprises two images 222 and 224 with an area of edge overlap 223. Image 222 may correspond to the content of layer 1, while image 224 may correspond to the content of layer 2. Thus, if layer 1 were de-selected in layer palette 210 and layer 2 were selected, image 224 may occupy space 218 and the space occupied to the left in window 212 may be depicted as empty.

Image 224 depicts another subject 217, along with additional features 228 (trees, a lake, and a hill in this example). A user can provide a command to the image editing software indicating that the images are to be blended. For example, a "blend" or "autoblend" command may be available under the "Layer" menu or may be an available command from a toolbar. After this command is received, the image editing software can carry out one or more suitable analyses to determine a blending type to suggest.

Figure 6:
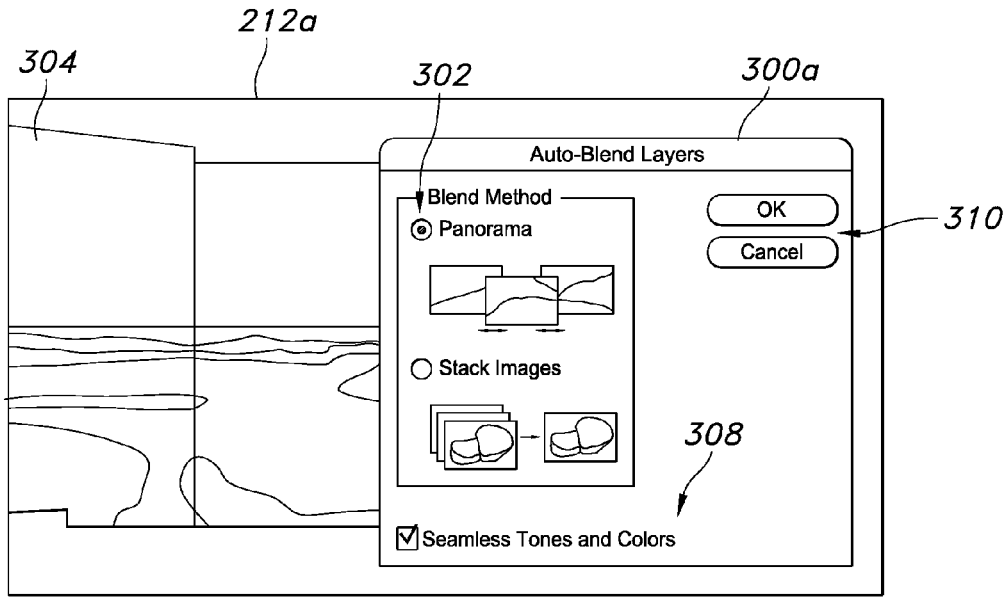
FIGS. 6 and 7 are each an example of a user interface for suggesting a blend technique to a user.

In this example, images 222 and 224 have some overlap as shown at 223, but otherwise do not have a great degree of overlapping area. Due to the amount of overlap (and/or metadata characteristics, if considered) a "panorama" blending operation may be suggested to the user. FIG. 6 provides an example of a user dialog 300A in which a suggestion 302 indicates a "panorama" blending technique. Dialog 300A is shown over another working area 212A depicting several components 304 of a panorama view.

In this example, the "panorama" radio button is pre-selected. However, other suitable selection mechanisms may be used, and the suggested blending technique may be provided in other ways (e.g. a pop-up notification, etc.). In this example, dialog 300A includes an additional parameter selection 308 where a user can opt to seamlessly blend tones and colors; it will be understood that multiple blending preferences could be indicated in dialog 300A. Dialog 300A also includes command buttons 310. Thus, if a user intends to use a panorama blending technique, the user merely needs to click OK or provide other input (e.g. press "enter" etc.) without selecting the blend method.

Returning to FIG. 5, the user may instead have provided a series of images intended for use in a stack-based blending technique. For example, rather than images 222 and 224, the layers may comprise images such as 232 and 234 shown at 230. In this example, images 232 and 234 generally share the same field of view but were captured with different areas in focus. For instance, image 232 depicts volcano 214 and subject 216. However, features far from subject 216 (such as crater 236) may be out of focus. In contrast, in image 234, subject 216 and nearby features are out of focus (indicated generally at 238 by cross-hatching). Instead, additional detail 240 of the crater 236 of volcano 214 is in better focus. As shown at 242 and by the dotted lines along the edges of image 234, image 234 shows a slightly offset field of view relative to image 232. For example, the camera that captured the images may have moved slightly due to wind, etc.

A user may have imported images such as 232 and 234 for combination into an extended depth-of-field image having the areas of better or best focus from the set of images. Although this example relates to a landscape, extended depth of field images may be of particular interest in macro photography, such as close-up views of insects, flowers, and other subjects. In any event, prior to blending, each image can be viewed as a separate layer. Due to the large degree of overlap, the contents of each layer generally occupy the same area after alignment.

A user can provide a command to the image editing software indicating that the images are to be blended. For example, a "blend" or "autoblend" command may be available under the "Layer" menu or may be an available command from a toolbar as noted above. After this command is received, the image editing software can carry out one or more suitable analyses to determine a blending type to suggest. In this example, due to the amount of overlap (and/or metadata characteristics, if considered), a "stack" blending operation may be suggested.

Figure 7:
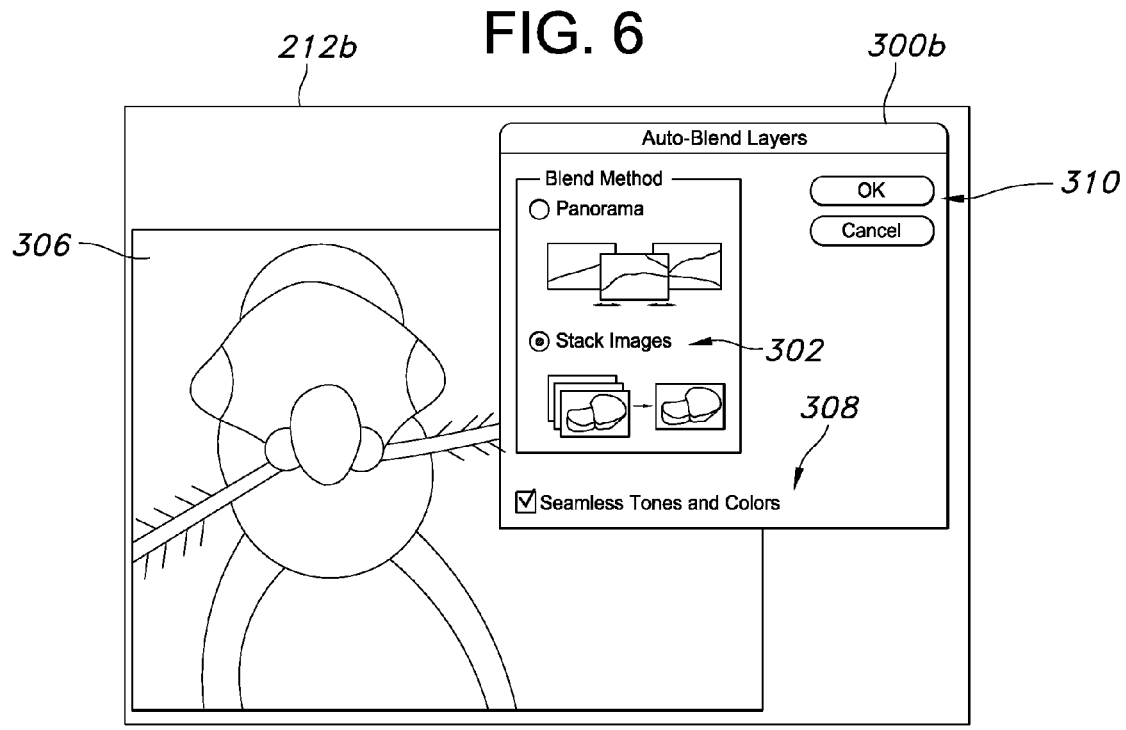

FIG. 7 shows a user dialog 300B in which a suggestion 302 indicates a "stack" blending technique. Dialog 300B is shown over another working area 212B depicting one layer 306 of a stack view of an insect. In different layers, different portions of the insect may be in focus.

In this example, suggestion 302 comprises pre-selection of the "stack image" radio button. However, other suitable selection mechanisms may be used, and the suggested blending technique may be provided in other ways (e.g. a pop-up notification, etc.). In this example, dialog 300B also includes an additional parameter selection 308 where a user can opt to seamlessly blend tones and colors; it will be understood that multiple blending preferences could be indicated in dialog 300B. Dialog 300B also includes command buttons 310. Thus, if a user intends to use a stack blending technique, the user merely needs to click OK or provide other input (e.g. press "enter" etc.) without the need to explicitly select the appropriate blend method.

Although not shown in dialog 300B, the suggestion may also identify a particular stack blending technique. In this example, the extended depth of field/best focus technique may be suggested based on analyzing the images and/or metadata characteristics of the files. For example, the software may analyze the overlapping area and check for focal length and/or aperture settings in metadata indicating different focus in the stacked images. As another example, for flash/no-flash techniques, the camera metadata may indicate that the flash was on in one image of the stack but off in another image. High dynamic range (HDR) stacks can be identified by a change of exposure while the focus remains the same.

Several examples above discussed suggestion of a default blending technique in the context of examples featuring relatively full-featured image processing software such as ADOBE® PHOTOSHOP®. However, it should be understood that the present subject matter could be applied in other contexts. For instance, image processing software can comprise a more limited set of features but still include the ability to determine the amount of common overlapping area and/or make other evaluations for selecting a default blending technique. As an example, an embedded system in a device may provide blending suggestions and receive selections through a limited user interface but may not provide palettes, windows, copy-and-paste, and other types of editing options.

The actual blending operation could be handled by separate software executed by the same or by a different computing device. For instance, a user could provide data identifying a plurality of image files and indicating the desire to perform blending on the files to image processing software that then suggests a blending technique. The suggested blending technique could be supplied to one or more other software components that actually implement the blending technique.

Figure 8:
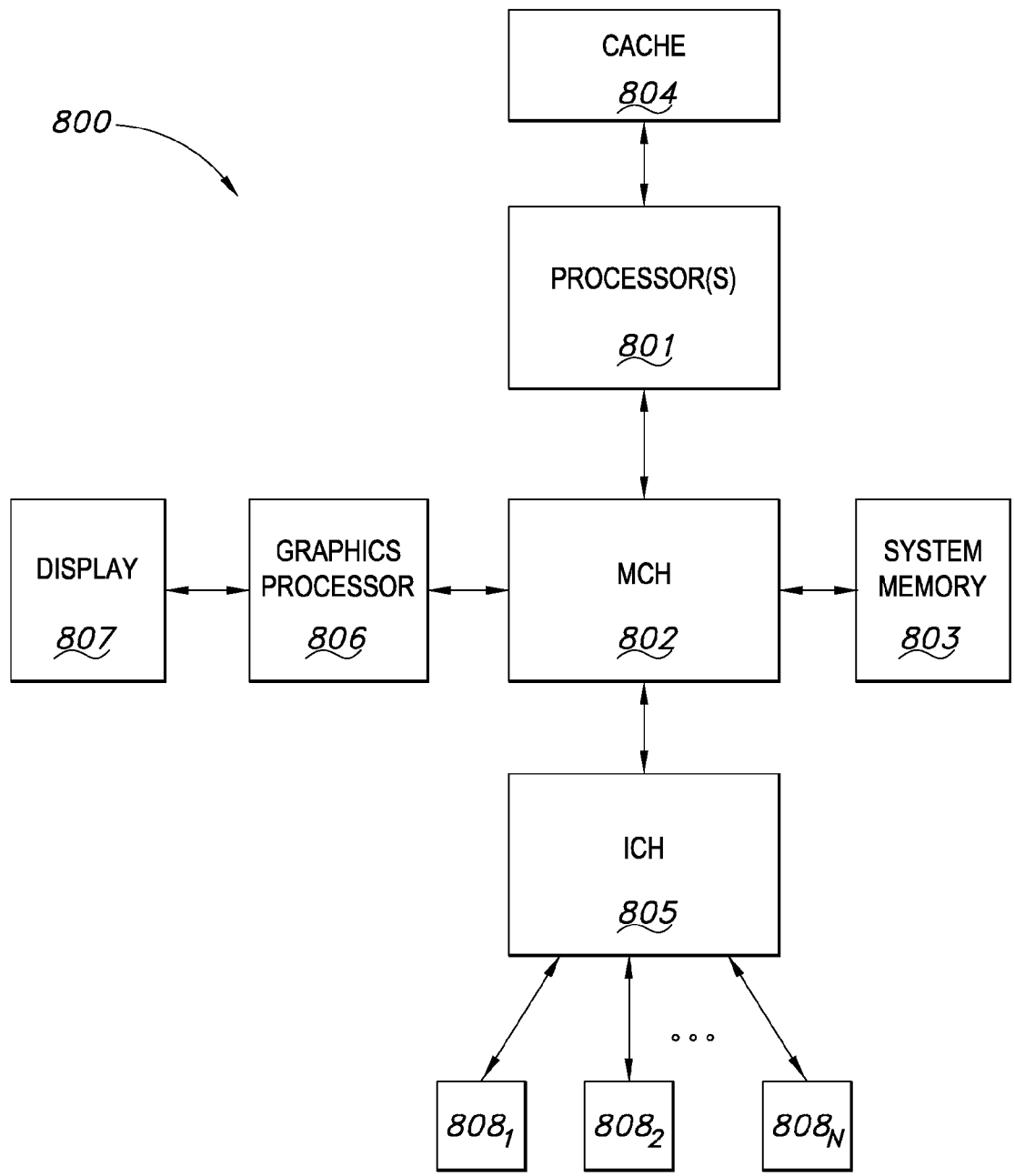
FIG. 8 is a block diagram depicting an example of a computing device suitable for implementing embodiments of the present subject matter.

FIG. 8 illustrates an example of computing device 800 suitable for implementing a server and/or client as described in the examples above. The exemplary computing system of FIG. 8 includes: 1) one or more processors 801; 2) a memory control hub (MCH) 802; 3) a system memory 803 (of which different types exist such as DDR RAM, EDO RAM, etc,); 4) a cache 804; 5) an I/O control hub (ICH) 805; 6) a graphics processor 806; 7) a display/screen 807 (of which different types exist such as Cathode Ray Tube (CRT), Thin Film Transistor (TFT), Liquid Crystal Display (LCD), DPL, etc.); and/or 8) one or more I/O devices 808.

The one or more processors 801 execute instructions in order to perform whatever software routines the computing system implements. The instructions frequently involve some sort of operation performed upon data. Both data and instructions are stored in system memory 803 and cache 804. Cache 804 is typically designed to have shorter latency times than system memory 803. For example, cache 804 might be integrated onto the same silicon chip(s) as the processor(s) and/or constructed with faster SRAM cells whilst system memory 803 might be constructed with slower DRAM cells. By tending to store more frequently used instructions and data in the cache 804 as opposed to the system memory 803, the overall performance efficiency of the computing system improves.

System memory 803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 803 prior to their being operated upon by the one or more processor(s) 801 in the implementation of a software program. Similarly, data that a software program determines should be sent from the computing system to an outside entity through one of the computing system interfaces, or stored into an internal storage element, is often temporarily queued in system memory 803 prior to its being transmitted or stored.

The ICH 805 is responsible for ensuring that such data is properly passed between the system memory 803 and its appropriate corresponding computing system interface (and internal storage device if the computing system is so designed). The MCH 802 is responsible for managing the various contending requests for system memory 803 access amongst the processor(s) 801, interfaces and internal storage elements that may proximately arise in time with respect to one another.

One or more I/O devices 808 are also implemented in a typical computing system. I/O devices generally are responsible for transferring data to and/or from the computing system (e.g., a networking adapter); or, for large scale non-volatile storage within the computing system (e.g., hard disk drive). ICH 805 has bi-directional point-to-point links between itself and the observed I/O devices 808.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the steps presented in the examples above can be varied—for example, steps can be re-ordered, combined, and/or broken into substeps. Certain steps or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like. Examples of media in which image files can be rendered include, but are not limited to, digital or analog video displays and physical materials in which an image can be fixed in a tangible form (e.g. photo or other paper, plastic, metal, cloth, glass, etc.). To output images, a computing device can be connected to a printer using inkjet, laser, thermal, or any other suitable printing techniques.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computerized method, comprising:
   accessing, by a processor, data identifying a plurality of digital image files for application of a blending technique;
   automatically selecting, by the processor, a default blending technique to apply to the plurality of digital image files from a plurality of blending techniques; and
   outputting, by the processor, data indicating the default blending technique;
   wherein the default blending technique is automatically selected based on an amount of common overlapping area between at least two images of the plurality of digital image files after alignment of the images.

2. The method set forth in claim 1, wherein outputting data indicating the default blending technique comprises:
   populating one of a plurality of selection options in a user dialog, each selection option of the plurality of selection options associated with a different blending technique;
   wherein the populated one of the selection options corresponds to the default blending technique.

3. The method set forth in claim 1, further comprising:
   creating a blended digital image by performing the default blending technique on the plurality of digital image files.

4. The method set forth in claim 1, wherein the default blending technique is selected by correlating the amount of overlapping area to a particular blending technique.

5. The method set forth in claim 1, wherein the default blending technique is further selected by:
   for each digital image file of the plurality of digital image files, determining a closest image overlap between that digital image file and second digital image file of the plurality of digital image files;
   wherein the closest image overlap for each file is within a range of overlap associated with the default blending technique.

6. The method set forth in claim 1, further comprising, prior to said accessing step, receiving user input identifying the plurality of digital image files and storing data identifying the plurality of digital image files.

7. The method set forth in claim 1, further comprising determining, by the processor, the alignment of the images, wherein determining the alignment comprises:
- assigning each of the plurality of digital image files to a layer; and
- positioning each layer such that one or more features common to each of the at least two images have identical area coordinates.

8. The method set forth in claim 7, wherein the default blending technique is selected as a panoramic blending technique based on determining that each of the at least two images share one or more common features near an edge of each of the at least two images.

9. The method set forth in claim 7, wherein the default blending technique is selected as a stack blending technique based on determining that at least one-half of the content of the at least two images overlap one another.

10. A system comprising at least one computing device configured to:
- access data identifying a plurality of digital image files for application of a blending technique;
- automatically select a default blending technique to apply to the plurality of digital image files from a plurality of blending techniques; and
- output data indicating the default blending technique;
- wherein the default blending technique is automatically selected based on an amount of common overlapping area between at least two images of the plurality of digital image files after alignment of the images.

11. The system set forth in claim 10, wherein providing output indicating the default blending technique comprises:
- populating one of a plurality of selection options in a user dialog, each selection option associated with a different blending technique;
- wherein the populated one of the selection options corresponds to the default blending technique.

12. The system set forth in claim 10, further configured to:
- create a blended digital image by performing the default blending technique on the plurality of digital image files.

13. The system set forth in claim 10, wherein the default blending technique is selected by correlating the amount of overlapping area to a particular blending technique.

14. The system set forth in claim 10, wherein the default blending technique is further selected by, for each digital image file of the plurality of digital image files, determining a closest image overlap between that digital image file and second digital image file of the plurality of digital image files;
- wherein the closest image overlap for each file is within a range of overlap associated with the default blending technique.

15. The system set forth in claim 10, wherein the default blending technique is selected based on evaluating at least one metadata characteristic of the plurality of digital image files.

16. The system set forth in claim 15, wherein at least one metadata characteristic specifies a flash status, exposure, focal length, or aperture setting.

17. The system set forth in claim 10, further configured to:
- receive user input identifying the plurality of digital image files and store data identifying the plurality of digital image files.

18. One or more non-transitory computer-readable media embodying program code which, when executed, causes at least one computing device to perform steps comprising:
- accessing data identifying a plurality of digital image files for application of a blending technique;
- automatically selecting, from a plurality of blending techniques, a default blending technique to apply to the plurality of digital image files; and
- outputting data indicating the default blending technique;
- wherein the default blending technique is automatically selected based on an amount of common overlapping area between at least two images of the plurality of digital image files after alignment of the images.

19. One or more computer-readable media as set forth in claim 18, wherein outputting data indicating the default blending technique comprises:
- populating one of a plurality of selection options in a user dialog, each selection option of the plurality of selection options associated with a different blending technique;
- wherein the populated one of the selection options corresponds to the default blending technique.

20. One or more computer-readable media as set forth in claim 18 which, when executed, causes at least one computing device to perform steps further comprising:
- creating a blended digital image by performing the default blending technique on the plurality of digital image files.

21. One or more computer-readable media as set forth in claim 18, wherein the default blending technique is further selected by, for each digital image file of the plurality of digital image files, determining a closest image overlap between that digital image file and second digital image file of the plurality of digital image files;
- wherein the closest image overlap for each file is within a range of overlap associated with the default blending technique.

22. One or more computer-readable media as set forth in claim 18, wherein the default blending technique is selected by correlating the amount of overlapping area to a particular blending technique.

23. One or more computer-readable media as set forth in claim 18, wherein the default blending technique is selected based on evaluating at least one metadata characteristic of the plurality of digital image files.

24. One or more computer-readable media as set forth in claim 23, wherein at least one metadata characteristic specifies a flash status, exposure, focal length, or aperture setting.

25. One or more computer-readable media as set forth in claim 18 which, when executed, causes at least one computing device to perform steps further comprising:
- prior to said accessing step, receiving user input identifying the plurality of digital image files and storing data identifying the plurality of digital image files.

\* \* \* \* \*